(No Model.)
C. STEIN.
CUSHION FELLY AND TIRE.
No. 482,392. Patented Sept. 13, 1892.
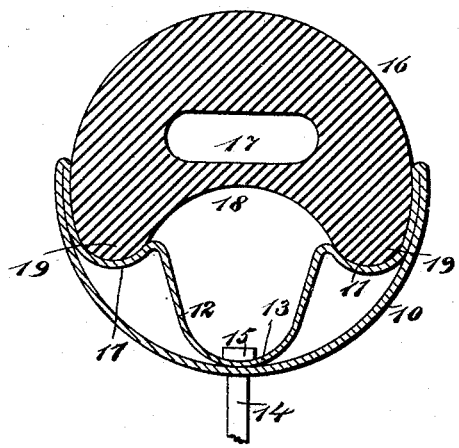
WITNESSES:
INVENTOR:
ATTORNEYS

UNITED STATES PATENT OFFICE.

CHARLES STEIN, OF MEADVILLE, PENNSYLVANIA.

CUSHION FELLY AND TIRE.

SPECIFICATION forming part of Letters Patent No. 482,392, dated September 13, 1892.

Application filed December 2, 1891. Serial No. 413,785. (No model.)

*To all whom it may concern:*

Be it known that I, CHARLES STEIN, of Meadville, in the county of Crawford and State of Pennsylvania, have invented a new and Improved Cushion Felly and Tire, of which the following is a full, clear, and exact description.

My invention relates to improvements in the construction of bicycle-wheels; and its object is to produce an extremely simple, cheap, and efficient cushion felly and tire, so that the cushion and tire together will have a double spring action, thus rendering the wheel fully as easy as the wheel provided with the pneumatic tire.

A further object of the invention is to construct the felly and tire so that the parts shall be strong and durable and so that the felly may be cheaply and easily secured in place upon the wheel and the tire as easily secured to the felly.

Reference is to be had to the accompanying drawing, forming a part of this specification, in which the figure is a cross-section of a felly and tire embodying my invention.

The felly 10 may be made of a tube in the usual way—that is to say, the tube may be crushed so as to make it of the desired shape, and it is preferably of spring material. In shaping the felly its outer side is provided with concaved sockets 11, which are adapted to receive the shoulders of the tire, and with a central nearly semi-cylindrical portion 12, this portion being crushed inward sufficiently for the middle portion of it to bear upon the middle portion of the body of the felly, as shown at 13, and this enables the spokes 14 of the wheel to be easily secured to the felly, as the fastening-nut 15 or equivalent fastening may be attached conveniently from the outside of the felly, and the hand or fingers may be placed within the bent portion 12 of the felly, so that the fastening may be secured with the utmost facility. This is a very important feature, as all of the fellies of this type heretofore used have their outer portion separated from their inner portion, so that the spokes cannot be secured in the manner described.

A further object of producing this central bend 12 and arranging the sockets 11 as described is to give to the felly a spring action, so that when the wheel meets with an unusually large obstruction or jolt and the vibration is not entirely taken up by the tire the remaining portion of the vibration will be absorbed by the spring action of the felly.

The tire 16 is made of rubber, is provided with a central bore 17 to give to it a cushion action, and it is cut away or concaved on its central middle portion, as shown at 18, so as to produce the side shoulders 19, which fit snugly in the sockets 11 of the felly. The tire is applied by springing it to place in the usual manner. It will be seen that any ordinary jar will be absorbed by the cushion-tire 16; but in the case of excessive shock, where the tire does not absorb all the vibration, the sides of the bent portion 12 will straighten out, the spring action of the metal admitting of this movement, and consequently the triple cushion action of the felly and tire will absorb any vibration with which a wheel would meet, and the wheel will therefore be very easy to ride upon. The tire 16 used in connection with the felly is of itself more elastic than the ordinary tire, as the concaving of the tire, as shown at 18, enables it to yield in almost every direction.

The triple action of the tire and felly is as follows: The outer portion of the tire will first yield on account of the bore 17. The inner portion of the tire will yield next by reason of the concavity 18, and after these cushion effects the felly will itself spring.

Having thus fully described my invention, I claim as new and desire to secure by Letters Patent—

1. The combination, with the felly having side sockets and having a central bent portion shaped to fit against the main part thereof, of a tire adapted to fit in the sockets of the fellies, substantially as described.

2. The combination, with the felly having side sockets and the central bend, the middle portion of the bend bearing against the body portion of the felly, of the hollow tire having a concaved inner portion and having shoulders to fit in the sockets of the felly, substantially as described.

3. The combination, with the spring-acting felly having retaining-sockets, of the hollow tire adapted to be seated in the sockets, the tire having a concave inner side to give it a double cushion action, substantially as described.

CHARLES STEIN.

Witnesses:
WARREN B. HUTCHINSON,
C. SEDGWICK.